(12) United States Patent
Onuma

(10) Patent No.: US 6,609,210 B1
(45) Date of Patent: Aug. 19, 2003

(54) DATA TRANSFER CONTROL METHOD AND APPARATUS, AND STORAGE MEDIUM

(75) Inventor: Nobuo Onuma, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/458,064

(22) Filed: Dec. 10, 1999

(30) Foreign Application Priority Data

Dec. 15, 1998 (JP) .................................. 10-375293

(51) Int. Cl.[7] .................................. G06F 3/12
(52) U.S. Cl. ............. 713/323; 713/324; 713/300; 710/15; 710/18; 710/60
(58) Field of Search ................. 713/323, 324, 713/300; 710/15, 18, 33, 60

(56) References Cited

U.S. PATENT DOCUMENTS

| | | | | |
|---|---|---|---|---|
| 5,832,285 A | * | 11/1998 | Shimada | ..................... 713/320 |
| 5,862,437 A | * | 1/1999 | Kutsuwada et al. | .......... 399/88 |
| 5,940,771 A | * | 8/1999 | Gollnick et al. | ............. 455/517 |
| 6,226,467 B1 | * | 5/2001 | Nakagawa et al. | ........... 399/55 |
| 6,230,277 B1 | * | 5/2001 | Nakaoka et al. | ............. 713/310 |
| 6,477,382 B1 | * | 11/2002 | Mansfield et al. | .......... 455/458 |

* cited by examiner

Primary Examiner—Jeffrey Gaffin
Assistant Examiner—Harold Kim
(74) Attorney, Agent, or Firm—Fitzpatrick, Cella, Harper & Scinto

(57) ABSTRACT

A data transfer control method for controlling data transfer between a host computer having a data generation processor and a data transfer processor, and a printer, dynamically adjusts the sleep time requested of the low-order data transfer processor in accordance with the data reception capability of the printer.

20 Claims, 4 Drawing Sheets

DATA TRANSFER CONTROL METHOD AND APPARATUS, AND STORAGE MEDIUM

BACKGROUND OF THE INVENTION

1. Field of the Invention

The present invention relates to a data transfer control method and apparatus for controlling data transfer between, e.g., a host computer as a high-order data processing apparatus having a high-order data generation processor and low-order data transfer processor, and a printer as a low-order data processing apparatus, and a storage medium that stores a control program for controlling the data transfer control apparatus.

2. Description of the Related Art

Conventionally, in a multi-task environment, data transfer to a printer is one of the roles of a printer driver. The printer driver has some roles, and data transfer is one of them. As for other roles of the printer driver, the printer driver generates RGB bitmap data by rendering in a memory on the basis of a rendering command passed from an application, color-converts rendered RGB data into CMYK data suitable for color reproduction characteristics of a printer, and performs halftoning of CMYK data when grayscale levels reproduced by the printer are limited.

In the multi-task environment, these roles of the printer driver are executed while individual tasks parallelly share a single CPU (central processing unit). But it is a common practice to execute a series of processes of the printer driver in series like rendering, color conversion, halftoning, and data transfer. It is important to these plurality of tasks that constitute the printer driver to achieve parallel processes while synchronouslly progressing the processes like bucket relay for determining the processing speed of the printer driver and total print time.

However, in the aforementioned prior art, since a data transfer processor must continue handshaking with a printer until a required number of bytes of data have been transferred to the printer, the CPU occupation time is prolonged due to the need for monitor and control of I/O ports.

The CPU occupation time of the data transfer processor largely depends on the data reception capability of the printer, e.g., the size of a reception buffer mounted in the printer, the processing performance of a processor mounted in the printer, and the like. For this reason, when the printer is not ready to receive data, it outputs a busy signal, and the data transfer processor must wait (stand by).

Under these circumstances, when data is transferred to a printer with low data reception capability, since the time required for the data transfer processor lengthens considerably compared to a printer with high data reception capability, the progress of processes of other tasks is retarded. As a result of the retarded progress of processes of other tasks, data to be transferred cannot be generated within a predetermined period of time, and the total print time increases. Also, if the printer is an ink-jet type serial printer, a wait (standby) time is produced between print scans and printed portions dry out during this time, resulting in deterioration of image quality such as stripe nonuniformity or the like.

SUMMARY OF THE INVENTION

The present invention has been made in consideration of the problems of the prior art, and has as its first object to provide a data transfer control method and apparatus which can implement data transfer without excessively occupying the CPU even when a printer as a low-order data processing apparatus has been switched to another model and its data reception capability has changed accordingly.

It is the second object of the present invention to provide a storage medium that stores a control program which can smoothly control the aforementioned data transfer control apparatus of the present invention.

In order to achieve the first object, a data transfer control method for controlling data transfer between a high-order data processing apparatus having a data generation processor and a data transfer processor, and a low-order data processing apparatus, is characterized by comprising the steps of:

dynamically adjusting a sleep time in accordance with data reception capability of the low-order data processing apparatus; and requesting the sleep time of the data transfer processor.

In order to achieve the first object, a data transfer control apparatus for controlling data transfer between a high-order processing apparatus having a data generation processor and data transfer processor, and a low-order data processing apparatus, is characterized by comprising:

sleep time adjustment means for dynamically adjusting a sleep time in accordance with data reception capability of the low-order data processing apparatus; and request means for requesting the sleep time of the data transfer processor.

In order to achieve the first object, a data transfer control method for controlling data transfer between a high-order data processing apparatus having a data generation processor and data transfer processor, and a low-order data processing apparatus, is characterized by comprising the steps of:

dynamically adjusting a sleep time in accordance with a time required for other tasks that execute processes parallelly; and requesting the sleep time of the data transfer processor.

In order to achieve the first object, a data transfer control apparatus for controlling data transfer between a high-order processing apparatus having a data generation processor and data transfer processor, and a low-order data processing apparatus, is characterized by comprising:

sleep time adjustment means for dynamically adjusting a sleep time requested in accordance with a time required for other tasks that execute processes parallelly; and request means for requesting the sleep time of the data transfer processor.

In order to achieve the first object, a data transfer control method for controlling data transfer between a high-order processing apparatus having a data generation processor and data transfer processor, and a low-order data processing apparatus, is characterized by comprising:

the time measurement step of measuring a time elapsed from a previous data transfer request to a current data transfer request;

the first comparison step of comparing the elapsed time measured in the time measurement step with an elapsed time between two previous data transfer requests;

the sleep time adjustment step of determining that a processing load on the data generation processor has become heavier and prolonging a sleep time requested of the data transfer processor when the current elapsed time is longer than the previous elapsed time, and of determining that the processing load on the data generation processor has become lighter and shortening the sleep time requested of the data transfer processor when the current elapsed time is shorter than the previous elapsed time;

the time computation step of computing a required transfer time for transfer per byte on the basis of a total required time upon transferring a data block having an arbitrary number of bytes;

the second comparison step of comparing the required transfer time per byte with a plurality of (N) threshold values determined arbitrarily; and the application step of applying a time obtained by dividing the required sleep time by the number N of threshold values prepared in advance when each threshold value condition is satisfied as a result of comparison in the second comparison step.

In order to achieve the first object, a data transfer control apparatus for controlling data transfer between a high-order processing apparatus having a data generation processor and data transfer processor, and a low-order data processing apparatus, is characterized by comprising:

time measurement means for measuring a time elapsed from a previous data transfer request to a current data transfer request;

first comparison means for comparing the elapsed time measured by said time measurement means with an elapsed time between two previous data transfer requests;

sleep time adjustment means for determining that a processing load on the high-order data generation processor has become heavier and prolonging a sleep time requested of the low-order data transfer processor when the current elapsed time is longer than the previous elapsed time, and for determining that the processing load on the high-order data generation processor has become lighter and shortening the sleep time requested of the low-order data transfer processor when the current elapsed time is shorter than the previous elapsed time;

time computation means for computing a required transfer time for transfer per byte on the basis of a total required time upon transferring a data block having an arbitrary number of bytes;

second comparison means for comparing the required transfer time per byte with a plurality of (N) threshold values determined arbitrarily; and application means for applying a time obtained by dividing the required sleep time by the number N of threshold values prepared in advance when each threshold value condition is satisfied as a result of comparison of said second comparison means.

In order to achieve the second object, a storage medium stores a control program for controlling a data transfer control apparatus for controlling data transfer between a high-order data processing apparatus having a data generation processor and a transfer processor, and a low-order data processing apparatus, and said control program is characterized by comprising a control module of the steps of:

dynamically adjusting a sleep time in accordance with data reception capability of the low-order data processing apparatus; and requesting the sleep time of the data transfer processor.

In order to achieve the second object, a storage medium stores a control program for controlling a data transfer control apparatus for controlling data transfer between a high-order processing apparatus having a data generation processor and a transfer processor, and a low-order data processing apparatus, and said control program is characterized by comprising a control module of the steps of:

measuring a time elapsed from a previous data transfer to a current data transfer;

comparing the measured elapsed time with an elapsed time between two previous data transfer requests;

determining that a processing load on the data generation processor has become heavier and prolong a sleep time requested of the data transfer processor when the current elapsed time is longer than the previous elapsed time, or determining that the processing load on the data generation processor has become lighter and shorten the sleep time requested of the data transfer processor when the current elapsed time is shorter than the previous elapsed time;

computing a required transfer time for transfer per byte on the basis of a total required time upon transferring a data block having an arbitrary number of bytes;

comparing the required transfer time per byte with a plurality of (N) threshold values determined arbitrarily; and applying a time obtained by dividing the required sleep time by the number N of threshold values prepared in advance when each threshold value condition is satisfied as a result of comparison.

In the present invention, for example, a host computer can be used as the high-order data processing apparatus. Also, for example, a printer can be used as the low-order data processing apparatus.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A preferred embodiment of the present invention will be described hereinafter with reference to the accompanying drawings.

Figure 1:
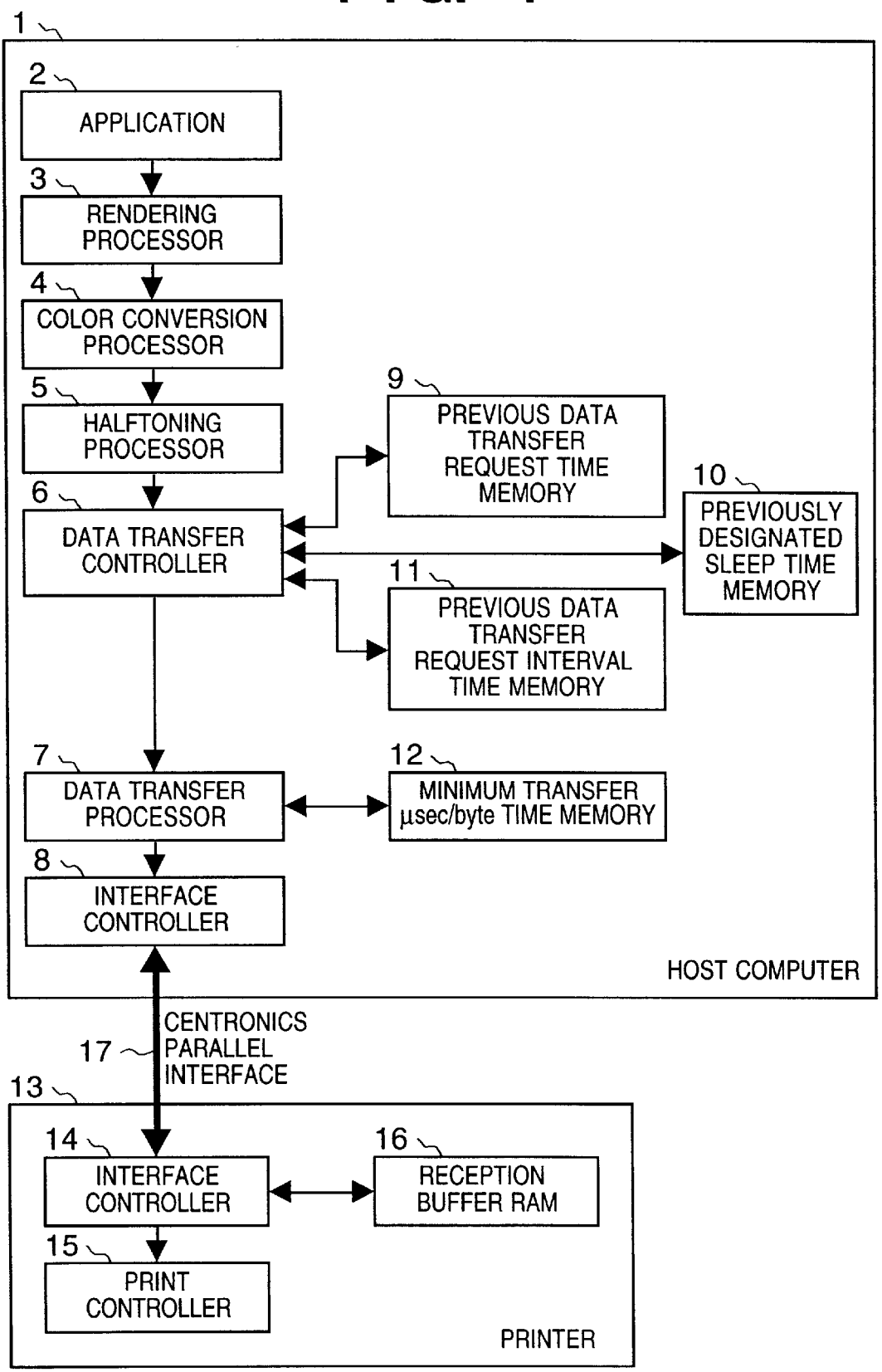
FIG. 1 is a block diagram showing the arrangement of a data transfer control apparatus according to an embodiment of the present invention.

FIG. 1 is a block diagram showing the arrangement of a data transfer control apparatus according to an embodiment of the present invention. Referring to FIG. 1, a host computer (high-order data processing apparatus) 1 has an application 2, rendering processor (high-order data generation processor) 3, color conversion processor (high-order data generation processor) 4, halftoning processor (high-order data generation processor) 5, data transfer controller 6, data transfer processor (low-order data generation processor) 7, interface controller 8, previous data transfer request time memory 9, previously designated sleep time memory 10, previous data transfer request interval time memory 11, and minimum transfer μsec/byte time memory 12.

Referring to FIG. 1, the application 2, the rendering processor 3, the color conversion processor 4, the halftoning processor 5, the data transfer controller 6, the data transfer processor 7, and the interface controller 8 are implemented as functions of respective programs executed by CPU of the host computer 1. The respective programs are stored in a memory such as ROM, RAM, or the like. Memories 9–12 maybe distinct memories or storage areas of an identical memory such as RAM.

The application 2 provides an image creation environment, and issues a print start command to the low-order processor. The rendering processor 3 renders pattern information created by the application 2 in a memory as RGB bitmap multi-valued data. The color conversion processor 4 converts the RGB bitmap multi-valued data rendered by the rendering processor 3 into CMYK multi-valued data in correspondence with the color reproduction characteristics of a printer (to be described later). The halftoning processor 5 adjusts the CMYK multi-valued data converted by the color conversion processor 4 to the number of grayscale levels of the printer when grayscale levels that can be reproduced by the printer are limited. The data transfer controller 6 receives a data transfer request of the CMYK multi-valued data which complies with the printer in terms of grayscale levels, and calls the data transfer processor 7 while storing and comparing data transfer request interval times. The data transfer processor 7 is called from the data transfer controller 6 to compute the sleep time on the basis of the required transfer time per byte, and implements data transfer via the interface controller 8 while sleeping for the computed sleep time. The interface controller 8 actually reads and writes data from and to a Centronics parallel interface 17 as an external interface via an I/O port. The previous data transfer time memory 9 is used as the storage area of the data transfer controller 6, and stores a previous data transfer request time. The previously designated sleep time memory 10 is used as the storage area of the data transfer controller 6, and stores a previously designated sleep time. The previous data transfer request interval time memory 11 is used as the storage area of the data transfer controller 6, and stores a previous data transfer request interval time. The minimum transfer μsec/byte time memory 12 is used as the storage area of the data transfer controller 6, and stores a minimum transfer μsec/byte time.

Also, referring to FIG. 1, a printer (low-order data processing apparatus) 13 is connected to the host computer 1 via the Centronics parallel interface 17. The printer 13 has an interface controller 14, print controller 15, and reception buffer RAM (random access memory) 16.

The interface controller 14 actually reads and writes data via the Centronics parallel interface 17 as an external interface that connects the host computer 1. When data reception cannot be immediately executed (e.g., when the reception buffer RAM 16 is full of data), the interface controller 14 has a role of issuing a busy signal to the external interface. The print controller 15 actually executes a print process. The reception buffer RAM 16 temporarily saves data received by the interface controller 14.

In this embodiment, the Centronics parallel interface 17 is quoted as the external interface. However, the present invention is not limited to such specific interface, and various other interfaces such as a SCSI interface or the like may be used.

The operation of the data transfer controller 6 that runs on the host computer 1 will be explained below with reference to the flow charts shown in FIGS. 2 and 3.

Figure 2:
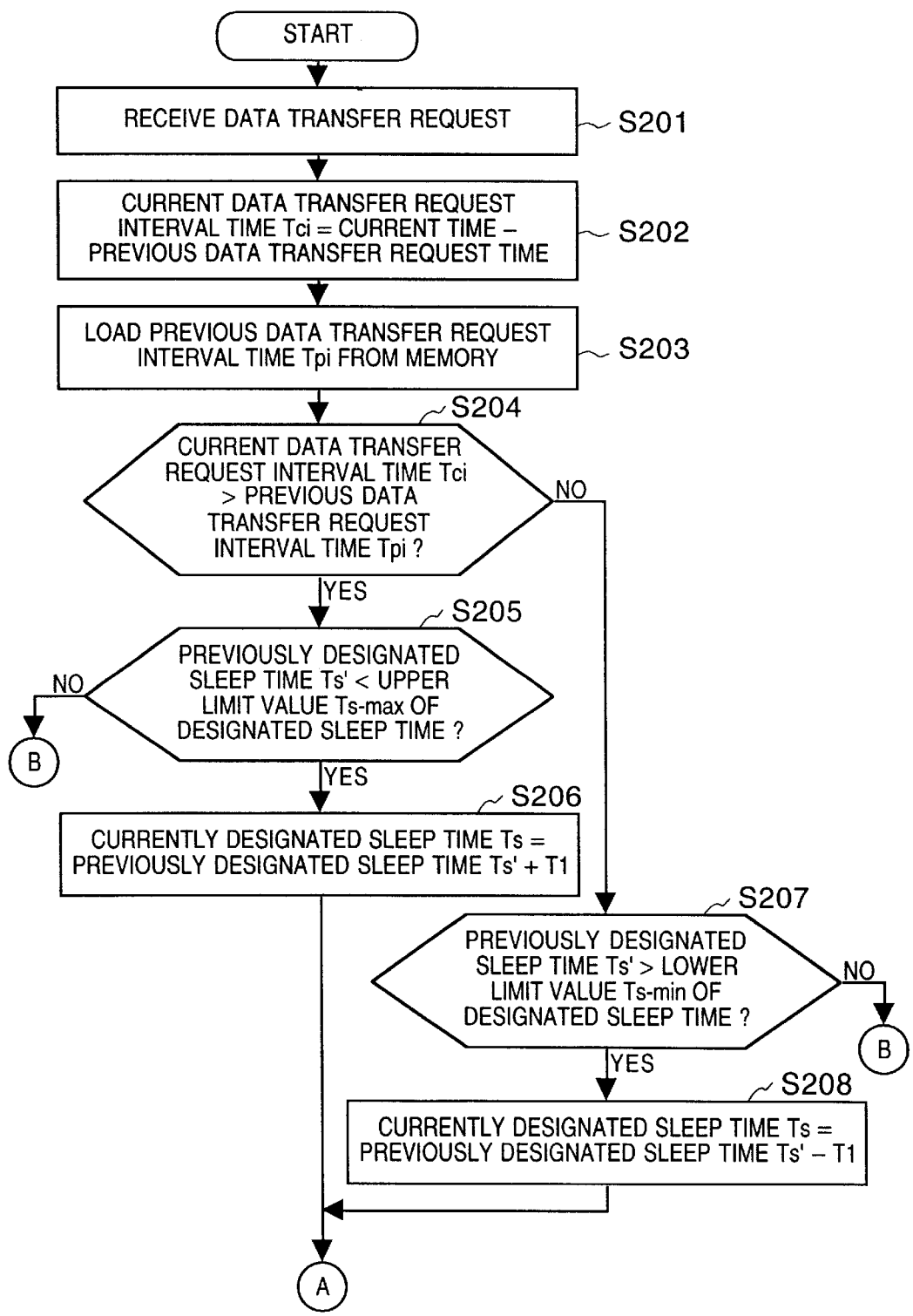
FIG. 2 is a flow chart showing the flow of operation of a data transfer controller in the data transfer control apparatus according to the embodiment of the present invention.

Referring to FIG. 2, the data transfer controller 6 receives a data transfer request from the high-order processor in step S201. The data transfer request is normally a command for commanding transfer of n-byte data from address m. In step S202, the data transfer controller 6 acquires the current time, and subtracts the previous data transfer request time stored in the previous data transfer request time memory 9 from the current time to compute a current data transfer request interval time Tci as the time elapsed from the previous data transfer request to the current one (current data transfer request interval time Tci=current time−previous data transfer request time). In step S203, the data transfer controller 6 loads (reads out) a previous data transfer interval time Tpi stored in step S213 in the previous process upon receiving the previous data transfer request from the previous data transfer request interval time memory 11.

The data transfer controller 6 checks in step S204 if the current data transfer request interval time Tci is larger than the previous data transfer request interval time Tpi (Tci>Tpi). If Tci>Tpi, the data transfer controller 6 determines that the processing load on the high-order rendering processor 3, color conversion processor 4, and halftoning processor 5 has increased from the previous process, and a longer CPU time is required, and the flow advances to step S205. On the other hand, if Tci≦Tpi, the data transfer controller 6 determines that the processing load on the high-order rendering processor 3, color conversion processor 4, and halftoning processor 5 has decreased from the previous process, and a longer CPU time is not required, and the flow advances to step S207.

In step S205, the data transfer controller 6 loads (reads out) a previously designated sleep time Ts' from the previously designated sleep time memory 10 and checks if the previously designated sleep time Ts' is smaller than an arbitrarily determined upper limit value Ts-max of the designated sleep time (Ts'<Ts-max). Note that Ts-max may be uniquely determined as a fixed value, or may be dynamically determined on the program in units of host computers in correspondence with the processing performance of CPUs.

Figure 3:
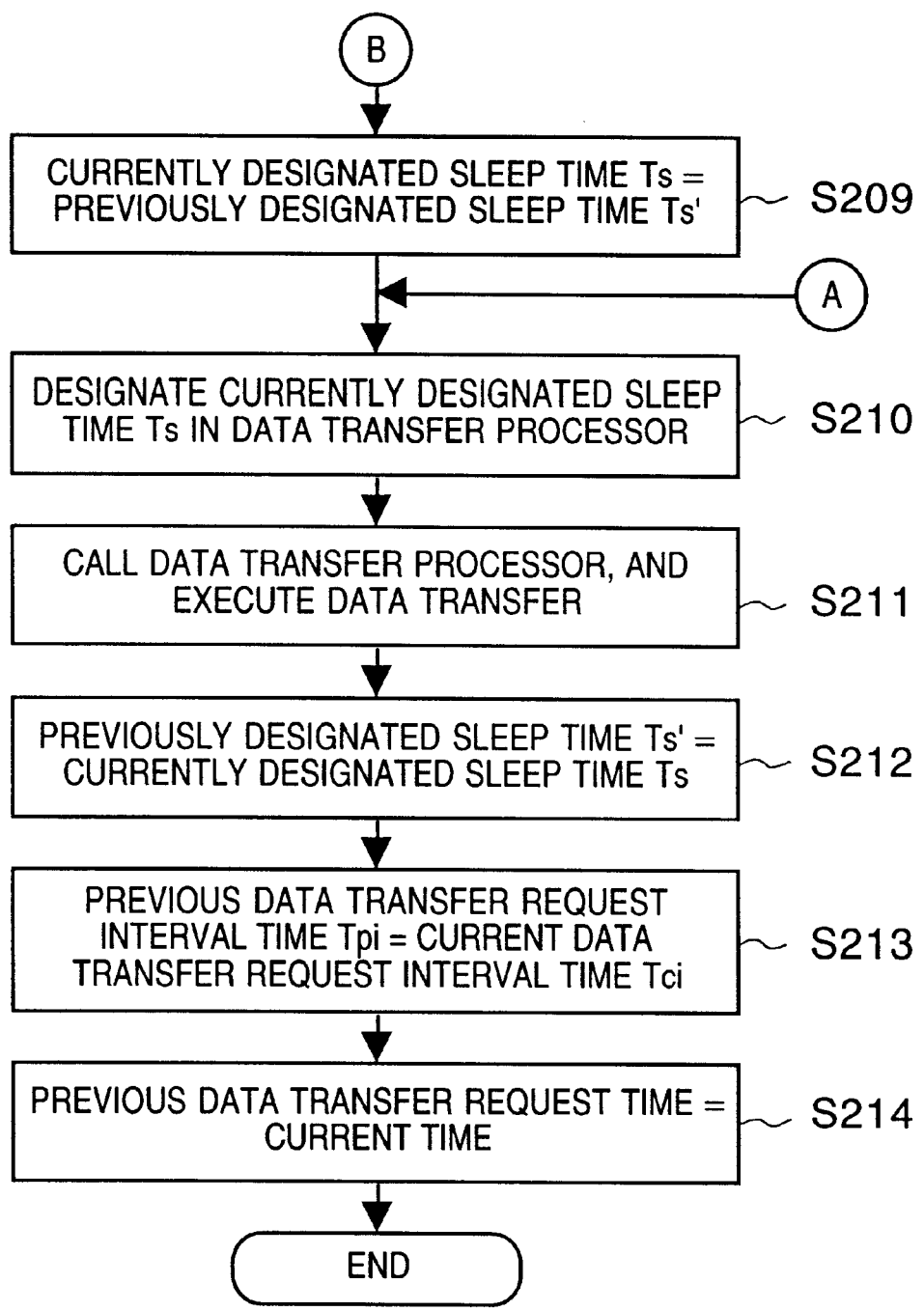
FIG. 3 is a flow chart showing the flow of operation of the data transfer controller in the data transfer control apparatus according to the embodiment of the present invention.

If Ts'<Ts-max in step S205, the flow advances to step S206; if Ts'≧Ts-max, the flow advances to step S209 in FIG. 3 so as not to increase the designated sleep time any more.

In step S206, the data transfer controller 6 adds an arbitrary time T1 to the previously designated sleep time Ts' to obtain a currently designated sleep time Ts (Ts=Ts'+T1), and the flow then jumps to step S210 in FIG. 3. Note that T1 may be uniquely determined as a fixed value, or may be dynamically determined on the program in units of host computers in correspondence with the processing performance of CPUs.

The data transfer controller 6 checks in step S207 if the previously designated sleep time Ts' is larger than an arbitrarily determined lower limit value Ts-min of the designated sleep time (Ts'>Ts-min). Note that Ts-min may be uniquely determined as a fixed value, or may be dynamically determined on the program in units of host computers in correspondence with the processing performance of CPUs.

If Ts'>Ts-min in step S207, the flow advances to step S208; if Ts'≦Ts-min, the flow advances to step S209 in FIG. 3 so as not to decrease the designated sleep time any more.

In step S208, the data transfer controller 6 subtracts an arbitrary time T1 from the previously designated sleep time Ts' to obtain a currently designated sleep time Ts (Ts=Ts'−T1), and the flow then jumps to step S210 in FIG. 3. Note that T1 may be uniquely determined as a fixed value, or may be dynamically determined on the program in units of host computers in correspondence with the processing performance of CPUs.

Referring to FIG. 3, the data transfer controller 6 substitutes the previously designated sleep time Ts' in the currently designated sleep time Ts (Ts=Ts') in step S209.

In step S210, the data transfer controller 6 informs the low-order data transfer processor 7 of the obtained currently designated sleep time Ts. It is a common practice to implement such information exchange using an inter-application communication, but the present invention is not particularly limited to such a specific implementation.

The flow then advances to step S211, and the data transfer controller 6 calls the data transfer processor 7 on the basis of the data transfer request received in step S201 in FIG. 2, thus executing data transfer. In step S212, the data transfer controller 6 stores the currently designated sleep time Ts in the previously designated sleep time memory 10 as the previously designated sleep time Ts' to prepare for reception of the next data transfer request. In step S213, the data transfer controller 6 stores the current data transfer request interval time Tci in the previous data transfer request interval time memory 11 as the previous data transfer request interval time Tpi to prepare for reception of the next data transfer request. In step S214, the data transfer controller 6 acquires the current time and stores the acquired current time in the previous data transfer time memory 9 as the previous data transfer request time to prepare for reception of the next data transfer request.

Upon receiving the next data transfer request, the data transfer controller 6 repeats the aforementioned sequence from step S201 in FIG. 2, thus determining the sleep time in the data transfer process in consideration of the CPU time currently required for the high-order processors.

The operation of the data transfer processor 7 which runs on the host computer 1 will be explained below using the flow chart shown in FIG. 4.

In step S301, the data transfer processor 7 receives the currently designated sleep time Ts designated in step S210 in FIG. 3. In step S302, the data transfer processor 7 acquires the current time and stores the acquired current time as a data transfer start time. In step S303, the data transfer processor 7 executes a data write process for writing M bytes designated from the data transfer controller 6 in an I/O port via the interface controller 8. Instep S304, the data transfer processor 7 acquires the current time again, and subtracts the data transfer start time acquired in step S302 from the acquired current time to compute the data transfer time required in step S303 (required data transfer time=current time−data transfer start time).

In step S305, the data transfer processor 7 divides the required data transfer time computed in step S304 by the number M of bytes that can be actually written to compute a transfer μsec/byte time Te required for transfer per byte (transfer μsec/byte time Te=required data transfer time÷M). The data transfer processor 7 then checks in step S306 if the transfer μsec/byte time Te computed in step S305 is equal to or smaller than an arbitrarily determined minimum transfer μsec/byte time Te-min (transfer μsec/byte time Te≦minimum transfer μsec/byte time Te-min).

A method of determining the minimum transfer μsec/byte time Te-min may use the transfer time required per byte by a general Centronics interface, or the average value of the required transfer times per byte obtained on the fly. In this embodiment, the following explanation will be given using the minimum value of the required transfer times per byte obtained on the fly.

If Te≦Te-min in step S306, the flow advances to step S307; if Te>Te-min, the flow advances to step S309.

In step S307, the data transfer processor 7 substitutes a value ⅓ the currently designated sleep time Ts designated in step S301 in a sleep time Tcs (sleep time Tcs=currently designated sleep time Ts÷3). In step S308, the data transfer processor 7 stores the current transfer μsec/byte time Te in the minimum transfer μsec/byte time memory 12 as the minimum transfer μsec/byte time Te-min (minimum transfer μsec/byte time Te-min=transfer μsec/byte time Te), and the flow then jumps to step S312.

The data transfer processor 7 checks in step S309 if the transfer μsec/byte time Te computed in step S305 is equal to or smaller than the arbitrarily determined minimum transfer μsec/byte time Te-min+50 [transfer μsec/byte time Te≦(minimum transfer μsec/byte time Te-min+50)]. In this embodiment, a value obtained by adding 50 to Te-min is used as the second comparison value. This value may be determined as a fixed value like in this embodiment, or may be dynamically determined on the program.

If Te≦Te-min+50 in step S309, the flow advances to step S310; if Te>Te-min+50, the flow advances to step S311.

In step S310, the data transfer processor 7 substitutes a value ⅔ the currently designated sleep time Ts designated in step S301 in the sleep time Tcs [sleep time Tcs=(currently designated sleep time Ts×2)÷3], and the flow then advances to step S312.

In step S311, the data transfer processor 7 substitutes the currently designated sleep time Ts designated in step S301 in the sleep time Tcs (sleep time Tcs=currently designated sleep time Ts), and the flow then advances to step S312.

In step S312, the data transfer processor 7 sleeps for the sleep time Tcs determined in accordance with the aforementioned sequence, and releases the CPU time by this sleep time to high-order processors to execute the processes of other tasks ahead of data transfer. Upon completion of the process in step S312, this routine ends.

Figure 4:
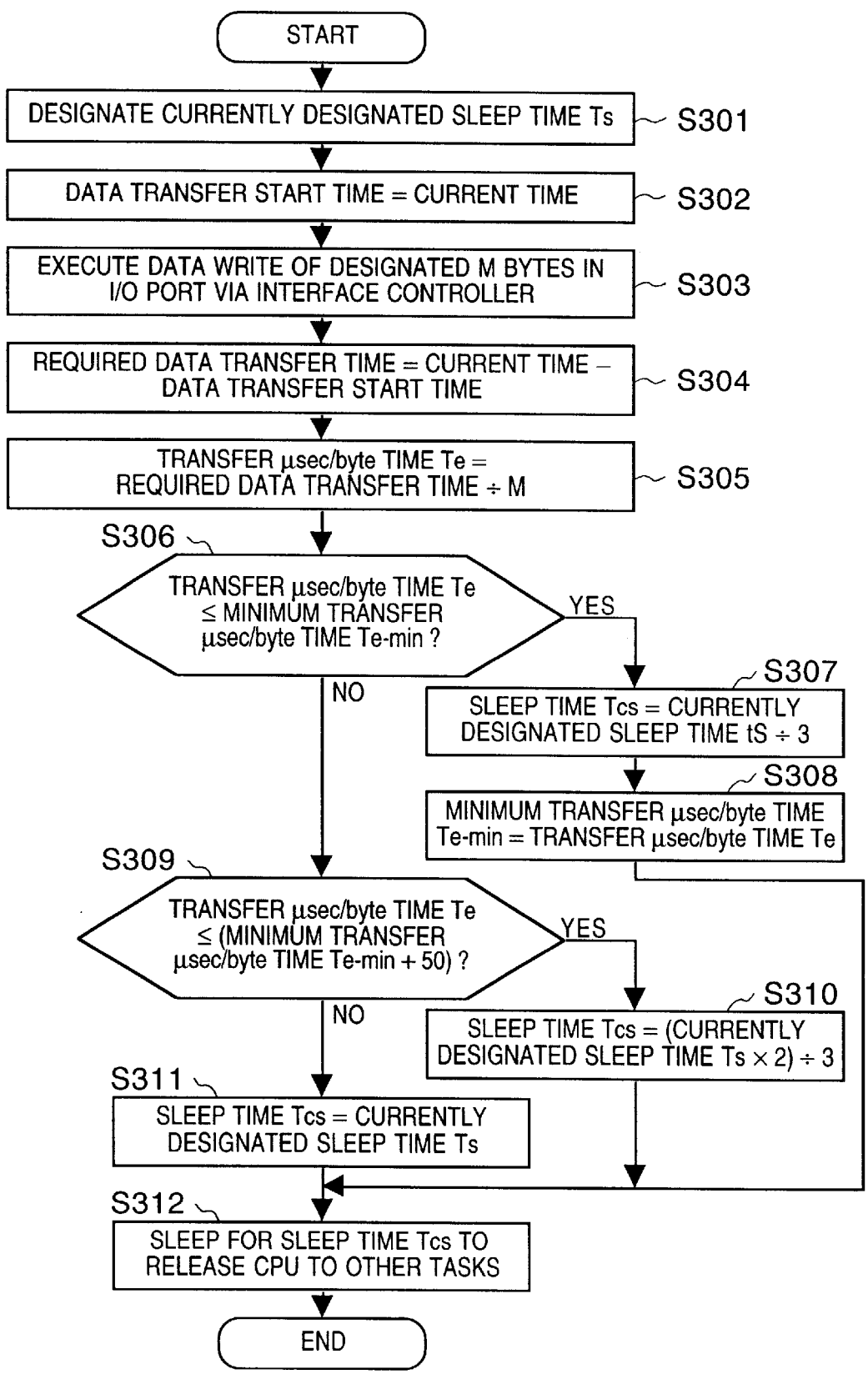
FIG. 4 is a flow chart showing the flow of operation of a data transfer processor in the data transfer control apparatus according to the embodiment of the present invention.

In this embodiment, the transfer μsec/byte time Te is compared with the minimum transfer μsec/byte time Te-min in step S306 in FIG. 4, and with the minimum transfer μsec/byte time Te-min+50 in step S309. The number of times of comparison is not limited to that in this embodiment. For example, when comparison is made N times, [sleep time Tcs=currently designated sleep time Ts÷N] in step S307, and [sleep time Tcs=(currently designated sleep time Ts×2)÷N] in step S310.

Of course, comparison processes in steps S306 and S309 are repeated (N−1) times.

To recapitulate, according to the data transfer control method and apparatus of the present embodiment, since the sleep time required for the data transfer processor in the high-order data processing apparatus is dynamically adjusted in accordance with the data reception capability of the printer or the like as the low-order data processing apparatus, data transfer can be implemented without excessively occupying the CPU even when the printer has been switched to another model and its data reception capability has changed accordingly.

Also, according to the data transfer control method and apparatus of the present embodiment, since the sleep time is dynamically adjusted in accordance with the time required for other tasks that execute processes parallely, the progress of processes of other tasks can be prevented from being disturbed.

Furthermore, according to the data transfer control method and apparatus of the present embodiment, the progress of processes of other tasks can be prevented from being retarded and required data transfer can be done sufficiently, when the present invention is applied to, e.g., a printer driver of an ink-jet type serial printer, no wait (standby) time is produced between print scans, and printed portion can be prevented from drying out, thus preventing deterioration of image quality such as stripe nonuniformity or the like.

The present invention can be achieved by a hardware which performs the aforesaid processes. Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, and optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A data transfer control method for controlling data transfer between a high-order data processing apparatus that includes a data generation processor and a data transfer processor, and a low-order data processing apparatus, said method comprising the steps of:

measuring a current elapsed time from a previous data transfer request to a current data transfer request;

comparing the current elapsed time measured in said measuring step with a previous elapsed time between two previous data transfer requests;

dynamically adjusting a sleep time by prolonging the sleep time when the current elapsed time is longer than the previous elapsed time, and by shortening the sleep time when the current elapsed time is shorter than the previous elapsed time; and requesting an adjusted sleep time of the data transfer processor.

2. The method according to claim 1, wherein the high-order data processing apparatus is a host computer.

3. The method according to claim 1, wherein the low-order data processing apparatus is a printer.

4. The method according to claim 1, wherein, in said step of requesting an adjusted sleep time, the sleep time is prolonged or shortened by adding a first predetermined value to or subtracting a second predetermined value from a previous sleep time, respectively.

5. The method according to claim 1, further comprising the steps of:

calculating a unit transfer time required for transferring unit data by the data transfer processor;

comparing the unit transfer time with at least one threshold value; and reducing the adjusted sleep time if the unit transfer time is not longer than the threshold value.

6. A data transfer control apparatus for controlling data transfer between a high-order processing apparatus that includes a data generation processor and data transfer processor, and a low-order data processing apparatus, said data transfer control apparatus comprising:

measurement means for measuring a current elapsed time from a previous data transfer request to a current data transfer request;

comparison means for comparing the current elapsed time measured by the measurement means with a previous elapsed time between two previous data transfer requests;

sleep time adjustment means for dynamically adjusting a sleep time by prolonging the sleep time when the current elapsed time is longer than the previous elapsed time, and by shortening the sleep time when the current elapsed time is shorter than the previous elapsed time; and request means for requesting an adjusted sleep time of the data transfer processor.

7. The apparatus according to claim 6, wherein the high-order data processing apparatus is a host computer.

8. The apparatus according to claim 6, wherein the low-order data processing apparatus is a printer.

9. A data transfer control method for controlling data transfer between a high-order processing apparatus that includes a data generation processor and data transfer processor, and a low-order data processing apparatus, said method comprising:

a time measurement step of measuring a current elapsed time from a previous data transfer request to a current data transfer request;

a first comparison step of comparing the current elapsed time measured in said time measurement step with a previous elapsed time between two previous data transfer requests;

a sleep time adjustment step of determining that a processing load on the data generation processor has become heavier and prolonging a sleep time requested of the data transfer processor when the current elapsed time is longer than the previous elapsed time, and of determining that the processing load on the data generation processor has become lighter and shortening the sleep time requested of the data transfer processor when the current elapsed time is shorter than the previous elapsed time;

a time computation step of computing a required transfer time for transfer per byte, based on a total required time upon transferring a data block having an arbitrary number of bytes;

a second comparison step of comparing the required transfer time per byte with a number N of threshold values determined arbitrarily; and an application step of applying a time obtained by dividing a required sleep time by the number N of threshold values prepared in advance when each threshold value condition is satisfied, as a result of a comparison in the second comparison step.

10. The method according to claim 9, wherein the high-order data processing apparatus is a host computer.

11. The method according to claim 9, wherein the low-order data processing apparatus is a printer.

12. A data transfer control apparatus for controlling data transfer between a high-order processing apparatus that includes a data generation processor and data transfer processor, and a low-order data processing apparatus, said data transfer control apparatus comprising:

time measurement means for measuring a current elapsed time from a previous data transfer request to a current data transfer request;

first comparison means for comparing the current elapsed time measured by said time measurement means with a previous elapsed time between two previous data transfer requests;

sleep time adjustment means for determining that a processing load on the high-order data generation processor has become heavier and prolonging a sleep time requested of the low-order data transfer processor when the current elapsed time is longer than the previous elapsed time, and for determining that the processing load on the high-order data generation processor has become lighter and shortening the sleep time requested of the low-order data transfer processor when the current elapsed time is shorter than the previous elapsed time;

time computation means for computing a required transfer time for transfer per byte, based on a total required time upon transferring a data block having an arbitrary number of bytes;

second comparison means for comparing the required transfer time per byte with a number N of threshold values determined arbitrarily; and application means for applying a time obtained by dividing a required sleep time by the number N of threshold values prepared in advance when each threshold value condition is satisfied as a result of a comparison by said second comparison means.

13. The apparatus according to claim 12, wherein the high-order data processing apparatus is a host computer.

14. The apparatus according to claim 13, wherein the low-order data processing apparatus is a printer.

15. A storage medium storing a control program for implementing a method of controlling a data transfer control apparatus that controls data transfer between a high-order data processing apparatus, which includes a data generation processor and a transfer processor, and a low-order data processing apparatus, the method comprising the steps of:

measuring a current elapsed time from a previous data transfer request to a current data transfer request;

comparing the current elapsed time measured in said measuring step with a previous elapsed time between two previous data transfer requests;

dynamically adjusting a sleep time by prolonging the sleep time when the current elapsed time is longer than the previous elapsed time, and by shortening the sleep time when the current elapsed time is shorter than the previous elapsed time; and requesting an adjusted sleep time of the data transfer processor.

16. The medium according to claim 15, wherein the high-order data processing apparatus is a host computer.

17. The medium according to claim 15, wherein the low-order data processing apparatus is a printer.

18. A storage medium storing a control program for implementing a method of controlling a data transfer control apparatus that controls data transfer between a high-order processing apparatus, which includes a data generation processor and a transfer processor, and a low-order data processing apparatus, the method comprising the steps of:

measuring a current elapsed time from a previous data transfer to a current data transfer;

comparing the measured current elapsed time with a previous elapsed time between two previous data transfer requests;

determining that a processing load on the data generation processor has become heavier and prolonging a sleep time requested of the data transfer processor when the current elapsed time is longer than the previous elapsed time, or determining that the processing load on the data generation processor has become lighter and shortening the sleep time requested of the data transfer processor when the current elapsed time is shorter than the previous elapsed time;

computing a required transfer time for transfer per byte, based on a total required time upon transferring a data block having an arbitrary number of bytes;

comparing the required transfer time per byte with a number N of threshold values determined arbitrarily; and applying a time obtained by dividing a required sleep time by the number N of threshold values prepared in advance when each threshold value condition is satisfied as a result of a comparison.

19. The medium according to claim 18, wherein the high-order data processing apparatus is a host computer.

20. The medium according to claim 18, wherein the low-order data processing apparatus is a printer.

* * * * *